United States Patent [19]
May

[11] Patent Number: 6,070,714
[45] Date of Patent: *Jun. 6, 2000

[54] CONVEYOR TRACK FOR PIECE GOODS

[75] Inventor: Bernd May, Ludwigshafen, Germany

[73] Assignee: Mannesmann Aktiengesellschaft, Düsseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,229

[22] Filed: Apr. 2, 1997

[30] Foreign Application Priority Data

Apr. 16, 1996 [DE] Germany ............... 196 16 907

[51] Int. Cl.$^7$ ............................................. B65G 15/60
[52] U.S. Cl. .................... 198/840; 198/817; 198/834; 198/837
[58] Field of Search ................ 198/817, 803.2, 198/465.3, 834, 836.1, 837, 840, 841

[56] References Cited

U.S. PATENT DOCUMENTS

| | | | |
|---|---|---|---|
| 207,626 | 9/1878 | Sargent | 198/840 X |
| 2,895,593 | 7/1959 | McKnight et al. | 198/841 X |
| 3,082,858 | 3/1963 | King | 198/841 |
| 3,312,330 | 4/1967 | Juengel | 198/817 |
| 3,360,105 | 12/1967 | Pelzer | 198/837 |
| 3,428,168 | 2/1969 | Hershey, Jr. | 198/803.2 |
| 3,561,623 | 2/1971 | McCaul | 198/350 |
| 3,705,001 | 12/1972 | Lingg et al. | 198/817 |
| 3,952,861 | 4/1976 | Holmqvist et al. | 198/817 |
| 4,204,673 | 5/1980 | Speer, Sr. | 198/817 |
| 5,013,286 | 5/1991 | Breher | 471/205 |
| 5,029,697 | 7/1991 | McMillan et al. | 198/817 |
| 5,123,517 | 6/1992 | Windau | 198/465.3 |
| 5,470,293 | 11/1995 | Schonenberger | 198/834 |

FOREIGN PATENT DOCUMENTS

| | | |
|---|---|---|
| 0 377 884 | 7/1990 | European Pat. Off. . |
| 0601279 A1 | 6/1994 | European Pat. Off. . |
| 4407163 C1 | 6/1995 | Germany . |
| 4011317 C3 | 12/1995 | Germany . |

OTHER PUBLICATIONS

Brochure entitled Spurzahnbänder und Spurzahnscheiben.

*Primary Examiner*—Christopher P. Ellis
*Assistant Examiner*—Patrick Mackey
*Attorney, Agent, or Firm*—Cohen, Pontani, Lieberman & Pavane

[57] ABSTRACT

A conveyor track or path for piece goods, and in particular for luggage containers, including at least two conveyors carrying the piece goods. The conveyors are approximately parallel to one another in the transporting direction and separated by a distance from one another. At least one of the conveyors has a driven endless conveyor belt which is guided over deflecting wheels. The conveyor belt is supported by carrying rollers which are arranged successively, one behind the other, between the deflecting wheels, as viewed in the transporting direction. In a preferred arrangement, the conveyor track comprises a toothed belt with teeth arranged on the side of the conveyor belt facing away from the piece goods and the driven deflecting wheels are toothed disks.

7 Claims, 3 Drawing Sheets

CONVEYOR TRACK FOR PIECE GOODS

BACKGROUND OF THE INVENTION

1. Field of the Invention

The invention is directed to a conveyor track for piece goods, especially for luggage containers.

2. Description of Related Art

A conveyor installation for pallets for parking motor vehicles is known from German patent publication 44 07 163 C1. This conveyor system substantially includes two conveyor belts for transporting pallets which run parallel to one another and at a distance from one another. The conveyor belts are constructed so as to be endlessly revolving and are guided, at the beginning and at the end of the conveyor track, over deflecting wheels or rollers which are rotatable about horizontal axes and driven by an electric motor. The transmission of a driving force between the deflecting wheels and the conveyor belt, which has a flat cross section, is effected by frictional engagement. Each deflecting wheel is supported at the end of two longitudinal supports running parallel in the conveying or transporting direction.

Between the deflecting rollers, as viewed in the transporting direction, the working section or upper length of the conveyor belt is additionally supported by carrying rollers which are also supported by the longitudinal supports. Guide rollers, which are rotatable about vertical axes, and guide rails, which extend laterally adjacent to the conveyor belt in the transporting direction, are provided for lateral guidance of the conveyor belt. Several other known means or configurations for guiding the conveyed goods include arranging guide disks at both sides of the carrying rollers, constructing the carrying rollers spherically, or providing the carrying rollers with a circumferential groove along which a web of complementary construction arranged on the underside of the conveyor belt is guided.

These known conveyor belts must be highly pretensioned in order to prevent possible slippage, as for example, between the driven deflecting wheels and the conveyor belt. Pretensioning of the conveyor belt is achieved by means of tensioning stations provided in different sizes based on the required tensioning length. Thus, it is not possible to standardize the tensioning stations. In addition, these high tensioning forces are absorbed by the supporting construction of the conveyor which therefore must be dimensioned and constructed accordingly. Moreover, the friction-type driving of the belt does not always guarantee synchronous running of the two parallel conveyor belts and thus, the pallets could twist and impair the dependability or reliability of transfer to subsequent conveyors.

European patent application 601 279 A1 discloses a running belt for passengers driven by two V-belts in conjunction or combined with two toothed belts. The running belt comprises step plates arranged successively in the transporting direction and oriented transversely to the transporting direction. The step plates are fastened or attached with their lateral ends on the combined V-belt and toothed belt. The running belt, and thus the V-belt/toothed belt combination which forms the running belt, are endless and revolve around deflecting pulleys or deflecting rollers arranged at the beginning and at the end of the running belt. This V-belt/toothed belt combination for driving the running belt is desirable over the conventional toothed belt drive running belt in that it introduces the principal driving force from the deflecting wheels to the V-belts and ensures that the teeth of the V-belt will synchronize the step plates driven at either end by the V-belt/toothed belt combination. As a result of this construction, the noise which is generated predominately by the teeth of the toothed belt engaging in the toothed disk is minimized. In order to optimize the noise reduction, the circumference of the toothed disks are simultaneously provided with alternating toothless portions toothed regions with the spacing between the tooth flanks on the toothed disk increased so that only one tooth flank of the toothed belt engages with the toothed disk. As for the drive, the toothed belt plays only a secondary role, since its main function is to synchronize the V-belt drive which is subject to slipping.

Therefore, the object of the present invention is to provide a conveyor track for piece goods, in particular for luggage containers, which has a simplified construction.

SUMMARY OF THE INVENTION

The present invention is directed to a conveyor track or path for piece goods, especially for luggage containers, including at least two conveyors carrying the piece goods and extending at a distance from one another and parallel to one another in the transporting direction. At least one of the conveyors has a driven endless conveyor belt which is guided over deflecting wheels and is approximately flat. The conveyor belt is supported by carrying rollers which, as viewed in the transporting direction, are arranged successively one behind the other between the deflecting wheels. The conveyor belt is a toothed belt with teeth arranged on the side of the conveyor belt which is remote or facing away from the piece goods. At least the driven deflecting wheels are toothed disks.

The conveyor belt preferably includes a web on the toothed side of the conveyor belt, projecting from the surface of the conveyor belt and extending approximately parallel to the longitudinal extension of the conveyor belt. Carrying rollers with a cylindrical circumferential surface are spaced apart from the teeth of the conveyor belt and are used to support the conveyor belt. A circumferential groove, complementary to the web, is defined about the deflecting wheel. Rims may be arranged at both sides of the carrying rollers to guide the conveyor belt.

The present inventive conveyor track or path may be constructed so that one conveyor has a conveyor belt and the other conveyor has transport rollers, which are preferably freewheeling, for transporting the piece goods. The transport rollers and carrying rollers are arranged at an offset relative to one another, as viewed in the transporting direction. A guide element is arranged on the underside of the piece goods and guided in a rail arranged between the conveyors and extending in the transport direction.

The invention provides a simpler construction of the tensioning station using a toothed belt as a conveyor belt for direct transport of the piece goods. As a result, the range of possible tensioning paths required or to be made available is reduced since the toothed belts used in the present invention, in comparison with the conventional conveyor belts, exhibit a reduced length expansion of only approximately 0.2%. Thus, tensioning stations of similar construction may be used for conveyor track portions in the range of approximately 1 m through 25 m. Another advantage of the present inventive conveyor track is that its operation is more dependable because of the positive engagement between the toothed belt and the deflecting wheels which substantially eliminates or reduces belt slippage and the associated problems resulting therefrom. Moreover, as a result of the positive engagement between the toothed belt and toothed disk for non-slip transmission of driving forces, smaller tensioning forces are required for the belts compared with flat belts and transmission of driving forces by frictional engagement. The smaller tensioning forces allow for a simpler support construction design.

The arrangement of a web projecting from the surface of the conveyor belt on the toothed side of the conveyor belt facing away from the piece goods and a complementary circumferential groove about the deflecting wheel provides lateral guidance of the conveyor belt in the region of the deflecting wheels. Continuous and uniform running of the conveyor belt on the upper side of the carrying rollers is achieved using the web in combination with the carrying rollers with a cylindrical circumferential surface, since the web, and not the teeth, runs along the circumferential surface of the carrying rollers. Thus, the piece goods are carefully transported at approximately the same time. Relatively quiet running of the conveyor belt is achieved and thus high running speeds of the conveyor belt may be realized without generating noise. As a result, the present inventive conveyor track may realize or attain transporting speeds of approximately 5 m/s which are particularly suitable for the transportation of airport luggage containers. In addition, flanges or rims may be provided on both sides of the carrying rollers to guide the conveyor belt. It is also preferred for the transmission of the piece good loads to the carrying rollers and for the transmission of driving forces to the piece goods that the conveyor belt be constructed as an approximately flat belt with an approximately rectangular cross section.

It is advantageous for transporting of piece goods, especially luggage containers, that the conveyor track be constructed with two approximately parallel conveyors extending in the transporting direction and separated by a distance from one another. One conveyor has a toothed belt and the other conveyor has transport rollers which are arranged one behind the other and designed so as to be freewheeling. This configuration prevents deviations from synchronous running of the toothed belt which results in a slanted or tilted position of the piece goods. Another advantage of this configuration is that the piece goods run more quietly on the conveyor because the transport rollers and the carrying rollers for the toothed belt are arranged offset relative to one another in the transporting direction.

The present inventive conveyor track may be constructed to include a guide element arranged on the underside of the container which is guided in a rail arranged between the conveyors and extending in the transporting direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figures 1, 2:
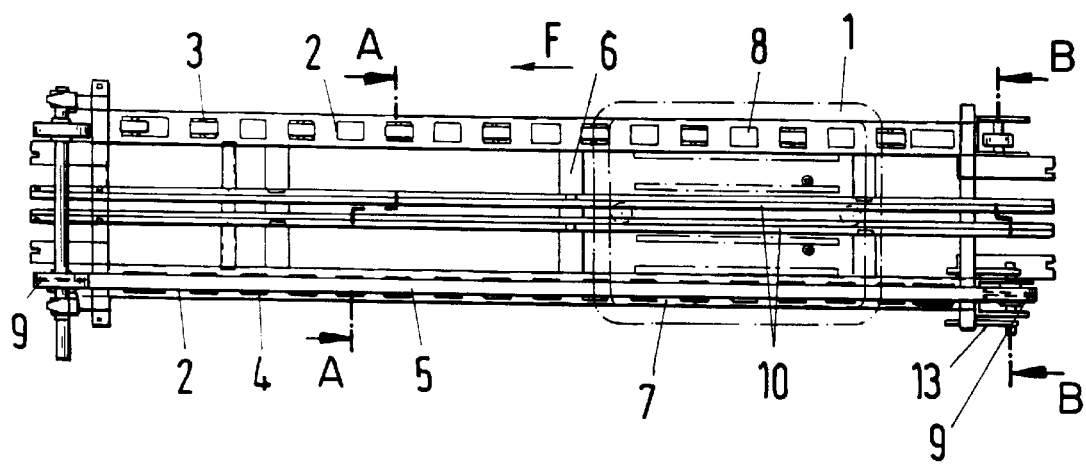
FIG. 1 shows a top view of a conveyor track for piece goods of the present invention.
FIG. 2 shows a left-hand side view, as viewed in the transporting direction, of the conveyor track of FIG. 1.

FIG. 1 shows a top view of a conveyor track or path for piece goods 1 in accordance with the present invention, and in particular for luggage containers, which includes two conveyors extending approximately parallel to one another and separated by a distance from one another and each comprising a longitudinal support 2. One of the conveyors includes transport rollers 3 and the other has carrying rollers 4 which support a conveyor belt 5. As shown in FIG. 1 and 2, the transport rollers 3 and carrying rollers 4 are arranged on respective longitudinal supports in succession, one after another, and spaced apart from one another by a distance, as viewed in the transporting direction F. The longitudinal supports 2 are C-shaped with their closed sides facing one another in the upright position and are connected to one another by a plurality of crosspieces 6 and to the base or floor by vertically adjustable fastening elements, not shown. Openings 8 are provided in the upper belt 7 of the longitudinal supports 2 and arranged in succession in the transporting direction F spaced apart from one another by a distance. Transport rollers 3 and carrying rollers 4 are supported at the webs of the longitudinal supports 2 about horizontally extending axes running transversely to the transporting direction F and project through the openings 8 from below. The transport rollers 3 are arranged on the right-hand side longitudinal support 2, as viewed in the transporting direction F, as a commercial roller bearing with a rubber jacket covering the outer ring. Thus, relatively low-noise running of the piece goods 1 along the transport rollers 3 is realized. On the other hand, the carrying rollers 4 are arranged on the left-hand side longitudinal support 2, as viewed in the transporting direction F, and support the conveyor belt 5. Conveyor belt 5 is designed as an endless belt which is deflected at the beginning and end of the longitudinal support 2 over deflecting wheels 9 which are rotatable about horizontal axes.

The transport rollers 3 and the carrying rollers 4 are preferably arranged in every second opening 8 such that, as viewed in the direction transverse to the transporting direction F, no transporting rollers 3 are arranged opposite the carrying rollers 4, and vice versa.

Still referring to FIG. 1, a guide rail 10 may be provided, preferably midway between the two longitudinal supports 2, and fastened or attached to the crosspieces 6. The guide rail 10 guides a guide element 11, preferably centered on the underside of the container or piece goods 1 as shown in FIG. 3.

FIG. 2 is a side view of the longitudinal support 2 of FIG. 1 including the carrying rollers 4 for the conveyor belt 5, i.e. the left-hand side longitudinal support 2 as viewed in the transporting direction F. It is evident from FIG. 2 that the carrying rollers 4 are arranged in every other opening 8. Both longitudinal supports 2 are constructed using a similar manufacturing technique. The under-portion of the conveyor belt 5 is guided via two support rolls 12. Support rolls 12 are separated by a distance from one another in the transporting direction F in order to prevent or reduce sagging and dragging of the conveyor belt on the base or floor. Deflecting wheels 9 are supported at the ends of the longitudinal supports 2. Specifically, the deflecting wheels 9 at one end of the longitudinal support 2 are drivable by means of a drive, not shown. On the other hand, deflecting wheels which are not driven are supported so as to be displaceable in the transporting direction F whereby the conveyor belt 5 may be pretensioned by a tensioning device 13.

Figure 3:
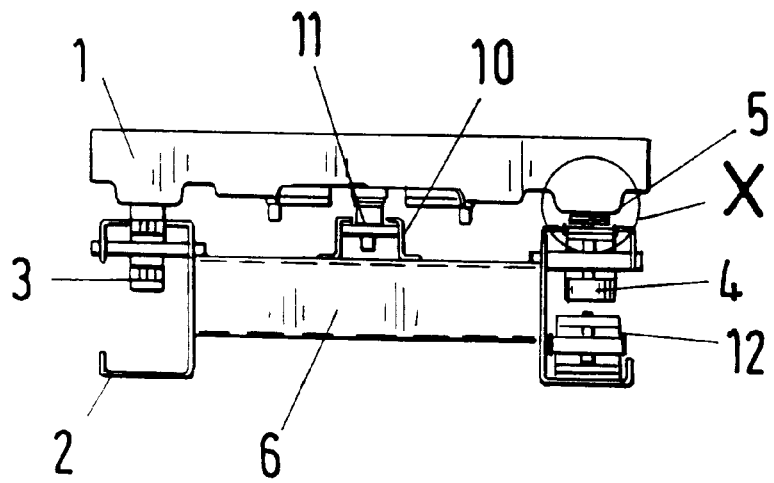
FIG. 3 shows a sectional view of the conveyor track of FIG. 1 along line A—A.

FIG. 3 shows a cross section of FIG. 1 along line A—A. A pin-like guide element 11 is arranged on the container or piece goods 1, preferably on the underside of the container. The guide element 11 is guided in a guide rail 10 which extends in the transporting direction F and prevents the container or piece goods 1 from lifting off of the conveyor track.

Figure 4:
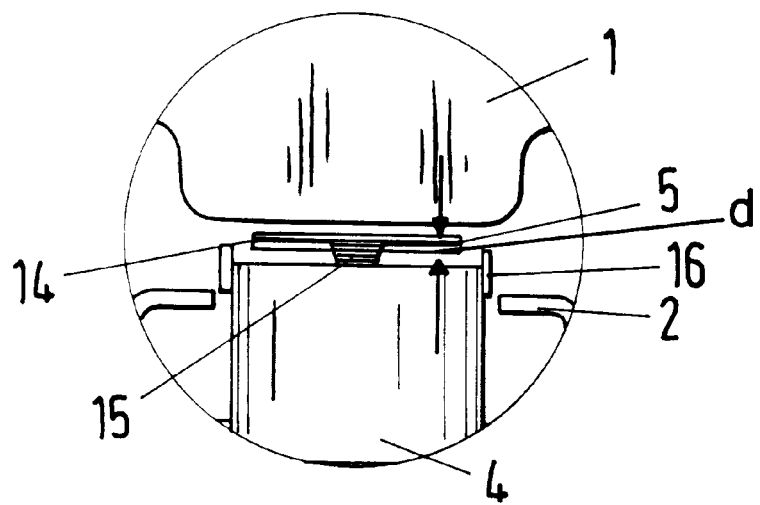
FIG. 4 shows an enlarged section of region x of the conveyor track of FIG. 3.

An enlarged view of the region x of the carrying rollers 4 of FIG. 3 is shown in FIG. 4. Carrying rollers 4 have a cylindrical circumferential surface without any grooves. The circumferential surface is separated by a vertical distance "d" from the teeth. The conveyor belt 5 is a toothed belt with a web 15 approximately centered on the side of the belt facing away from the piece goods 1. The web 15, preferably having a trapezoidal cross section, projects downward from the contour of the teeth 14 of the conveyor belt 5 in the direction of or towards the carrying roller 4. In an alterative embodiment or configuration, the toothed belt may be used as a conveyor belt 5 without web 15. Web 15 extends in the longitudinal direction of the conveyor belt 5 and is supported or carried by the surface of the carrying roller 4. The height of the teeth 14 of the conveyor belt is selected or designed so as to prevent the teeth from contacting the surface of the carrying rollers 4 and results in a relatively low-noise running of the conveyor belt 5. Lateral rims 16 may be arranged on the sides of the carrying rollers 4 to guide the conveyor belt 5.

Figure 5:
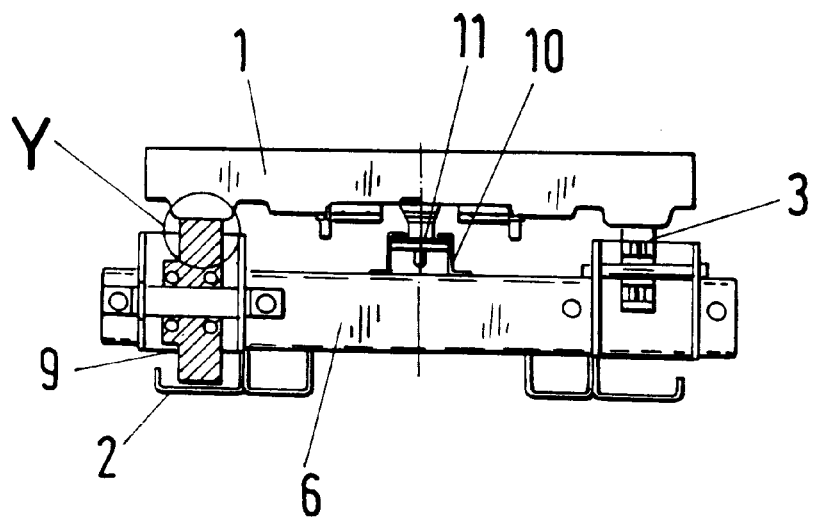
FIG. 5 shows a sectional view of the conveyor track of FIG. 1 along line B—B.
Figure 6:
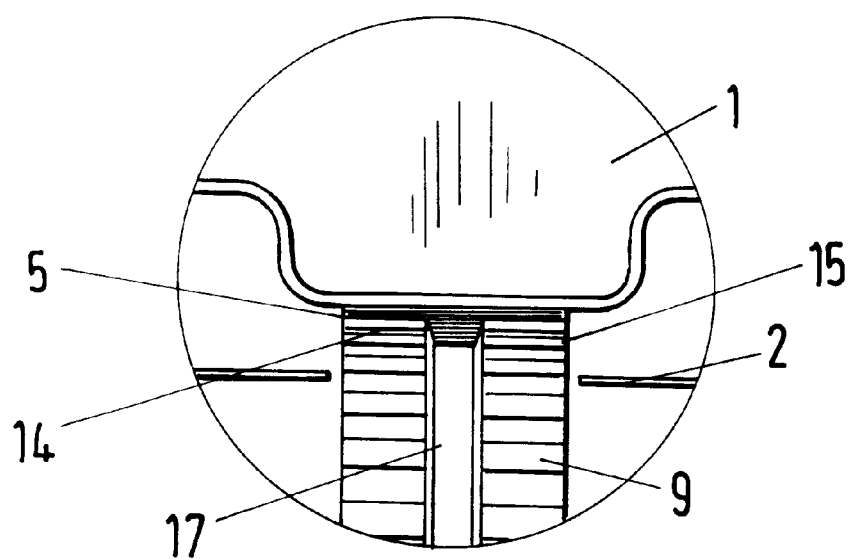
FIG. 6 shows an enlarged section of region y of the conveyor track of FIG. 5.

FIG. 5 shows a cross sectional view of FIG. 1 along line B—B and region y of FIG. 5 is shown enlarged in FIG. 6. As shown in FIG. 6, the deflecting wheels 9 are constructed as toothed disks with a circumferential groove 17 approximately centrally defined and complementary to the web 15 of the conveyor belt 5. The driven deflecting wheels 9 arranged on the opposite side of the longitudinal support 2 are constructed in a corresponding manner. In an alternative embodiment or modification, the non-driven deflecting wheels 9 may be similar in construction to the carrying rollers 4, that is, with a non-profiled cylindrical surface, in order to realize a relatively quiet running of the conveyor belt 5.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A conveyor track for transporting piece goods comprising:

two conveyors for carrying said piece goods extending approximately parallel to one another in a transporting direction of said piece goods and separated from one another by a distance;

a driven endless toothed conveyor belt operatively disposed about one of said conveyors, said conveyor belt being substantially flat with teeth arranged on a side of said conveyor belt facing away from said piece goods wherein said conveyor belt comprises a web projecting from the toothed side of said conveyor belt and extending approximately parallel to said conveyor belt in the transporting direction;

deflecting wheels disposed so as to guide said conveyor belt, said deflecting wheels including a driven deflecting wheel comprising a toothed disk and a non-driven deflecting wheel; and carrying rollers disposed so as to support said conveyor belt and, as viewed in the transporting direction, successively arranged with one of said carrying rollers behind the other between said deflecting wheels, said carrying rollers carrying the web of the conveyor belt and having circumferential surfaces arranged opposite to the teeth of said conveyor belt and separated by a vertical distance from the teeth of said conveyor belt.

2. The conveyor track in accordance with claim 1, wherein said carrying rollers are cylindrically shaped.

3. The conveyor track in accordance with claim 1, wherein said deflecting wheels have circumferential grooves defined thereabout complementary to the web.

4. The conveyor track in accordance with claim 1, wherein said carrying rollers comprise rims disposed about both sides of said carrying rollers to guide said conveyor belt.

5. The conveyor track in accordance with claim 1, wherein said piece goods are luggage containers.

6. The conveyor track of claim 1 wherein at least one of the conveyors has openings.

7. The conveyor track of claim 6 wherein the carrying rollers are arranged in every other opening.

* * * * *